US009586269B2

(12) United States Patent
McCluskey et al.

(10) Patent No.: US 9,586,269 B2
(45) Date of Patent: Mar. 7, 2017

(54) COLLET ADAPTER

(71) Applicant: ANCA Pty Ltd, Bayswater North (AU)

(72) Inventors: Pat McCluskey, Bayswater North (AU); Sateesh Savanur, Bayswater North (AU); Hansruedi Napflin, Beckenried (CH)

(73) Assignee: Anca Pty Ltd, Victoria (AU)

( * ) Notice: Subject to any disclaimer, the term of this patent is extended or adjusted under 35 U.S.C. 154(b) by 176 days.

(21) Appl. No.: 14/383,909

(22) PCT Filed: Mar. 12, 2013

(86) PCT No.: PCT/AU2013/000245
§ 371 (c)(1),
(2) Date: Sep. 9, 2014

(87) PCT Pub. No.: WO2013/131151
PCT Pub. Date: Sep. 12, 2013

(65) Prior Publication Data
US 2015/0061234 A1   Mar. 5, 2015

(30) Foreign Application Priority Data
Mar. 9, 2012   (AU) ................. 2012900951

(51) Int. Cl.
*B23B 31/36* (2006.01)
*B23B 31/20* (2006.01)
(Continued)

(52) U.S. Cl.
CPC ............ *B23B 31/20* (2013.01); *B23B 31/207* (2013.01); *B23B 31/26* (2013.01); *B23B 31/36* (2013.01);
(Continued)

(58) Field of Classification Search
CPC . B23B 31/207; B23B 31/36; B23B 2260/127; B23B 2260/136; B23B 31/20;
(Continued)

(56) References Cited

U.S. PATENT DOCUMENTS 2,848,239 A   8/1958   Benjamin et al.
3,778,071 A   12/1973   Buck
(Continued)

FOREIGN PATENT DOCUMENTS

| EP | 0030828 A1 | 6/1981 |
|---|---|---|
| EP | 887135 A1 | 12/1998 |
| JP | 2001246509 A | 9/2001 |

OTHER PUBLICATIONS

Machine Translation of EP887135A1 by Lexis Nexis Total Patent on Jan. 28, 2016.
(Continued)

*Primary Examiner* — Eric A Gates
*Assistant Examiner* — Paul M Janeski
(74) *Attorney, Agent, or Firm* — Woodard, Emhardt, Moriarty, McNett & Henry LLP

(57) ABSTRACT

A collet adaptor 20 including a work piece clamp mechanism 29. The collet adaptor 20 is rotatable about a first axis A and the work piece clamp mechanism 29 is mounted within the collet adaptor 20 for rotation with the collect adaptor 20. The clamp mechanism 29 is also mounted for movement laterally to the first axis A during rotation of the collet adaptor 29. The clamp mechanism 29 can also be mounted within the collect adaptor 20 for rotational movement lateral to the first axis A during rotation of the collect adaptor 20.

16 Claims, 6 Drawing Sheets

(51) Int. Cl.
*B23B 31/26* (2006.01)
*B23Q 3/12* (2006.01)

(52) U.S. Cl.
CPC .......... *B23Q 3/12* (2013.01); *B23B 2260/124* (2013.01); *B23B 2260/136* (2013.01); *Y10T 279/1004* (2015.01); *Y10T 279/13* (2015.01); *Y10T 279/17538* (2015.01); *Y10T 279/17632* (2015.01); *Y10T 279/34* (2015.01)

(58) Field of Classification Search
CPC . B23B 31/26; Y10T 279/1004; Y10T 279/13; Y10T 279/17538; Y10T 279/17632; Y10T 279/34; B23Q 3/12
See application file for complete search history.

(56) References Cited

U.S. PATENT DOCUMENTS 4,439,075 A 3/1984 Wiederkehr
4,547,101 A 10/1985 Dowdakin, Sr.

OTHER PUBLICATIONS

Machine Translation of JP2001246509A by Lexis Nexis Total Patent on Jan. 28, 2016.

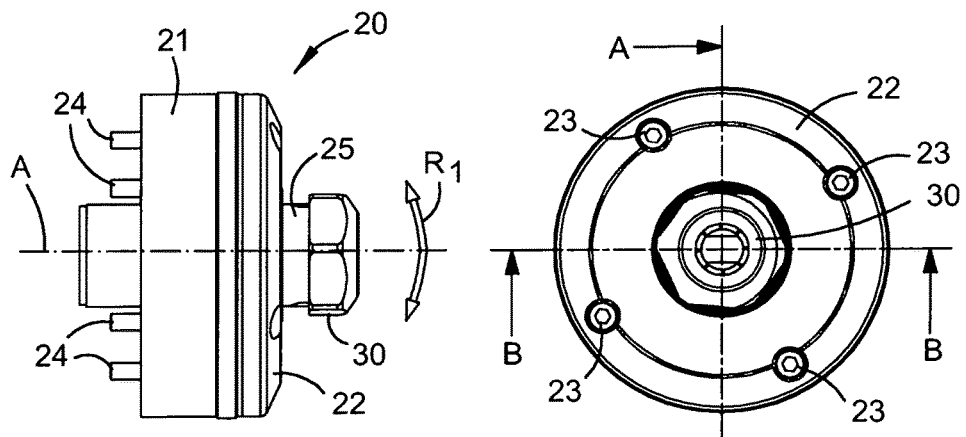
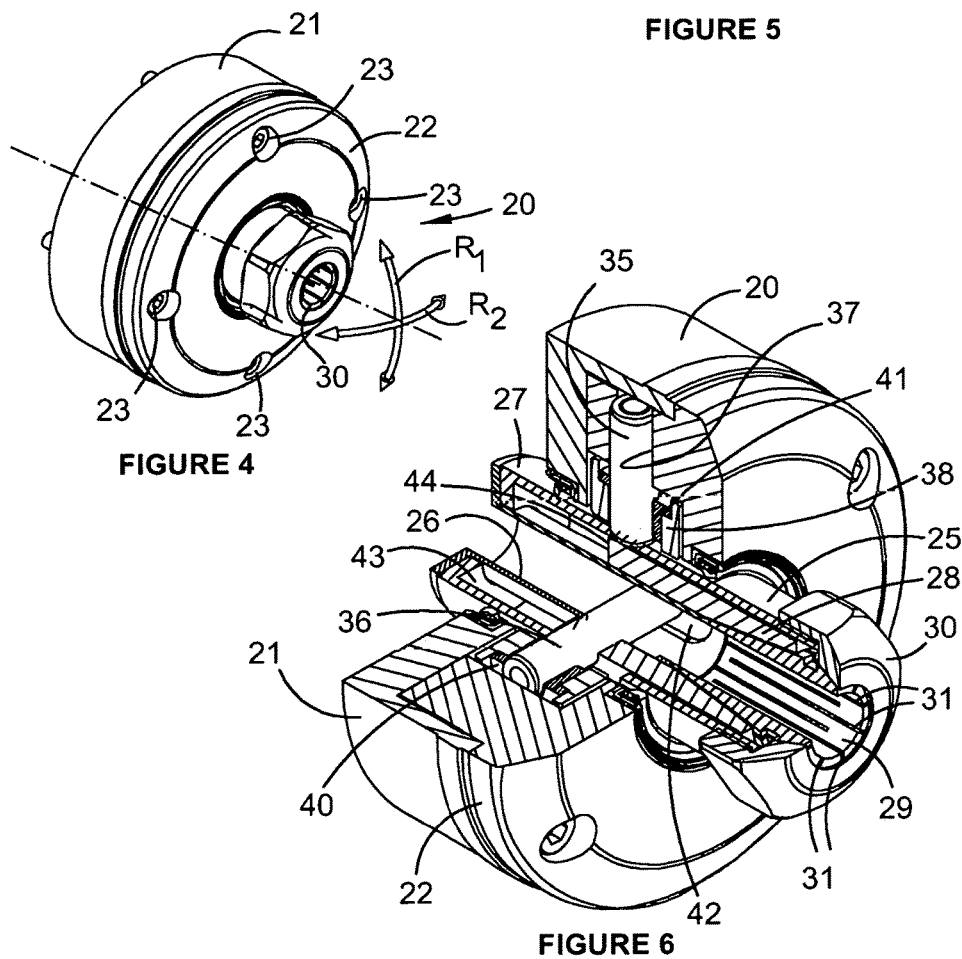

SECTION A-A

SECTION B-B

COLLET ADAPTER

REFERENCE TO RELATED APPLICATIONS

This application is the U.S. national stage application of International Patent Application No. PCT/AU2013/000245, filed Mar. 12, 2013, which claims priority of Australia Application No. 2012900951, filed Mar. 9, 2012, the disclosures of each of which are incorporated herein by reference in their entirety.

FIELD OF THE INVENTION

The present invention relates to a collet adapter which has been developed principally for use in workpiece forming machinery, such as computer numerically controlled (CNC) grinding or milling machinery or other grinding or milling machinery. The collet adapter of the present invention has been developed particularly for use in high precision CNC machinery, although it is to be appreciated that it is not intended to be restricted to use in that type of machinery only.

Reference herein to the term "workpiece" is intended to include a wide group of objects for machining, including cutting tools, punches, pins, dental burrs, and effectively any object with a cylindrical shaft.

BACKGROUND OF THE INVENTION

A collet adapter can include a collet in which a workpiece can be clamped for machining. The collet is usually releasable from the collet adapter so that different sized collets can be mounted in the collet adapter. Different sized collets are used for machining different sized workpieces. Collets have longitudinal "fingers" that move radially between clamped and unclamped conditions and move between these positions by forward and backward movement of the collet relative to the collet adapter. Thus, forward movement of the collet within the collet adapter can allow the fingers to shift radially outwardly to open the collet to receive or release a workpiece (the unclamped condition), while rearward movement of the collet shifts the fingers radially inwardly about a workpiece to allow the collet to clamp a workpiece. Clamping and unclamping can also occur in the reverse direction. Once clamped, the collet adapter can be driven to rotate as required for machining of the portion of the workpiece that extends out of the collet.

In addition to clamping by the collet, a workpiece being machined can be supported by a workpiece support which is separate from the collet adapter. The workpiece support is spaced from the front end of the collet adapter and reacts or counters loads imposed on the workpiece by the machining process. The workpiece being machined can be clamped to the workpiece support during machining to enhance the stability with which the workpiece is supported, but the clamping load must be such that it allows the workpiece to be rotated about the centre-line of the workpiece relative to the workpiece support.

FIG. 1 illustrates a general arrangement showing a collet adapter 10, and includes a collet holder 11 and a collet 12 mounted within the collet holder 11. In practice, a workpiece W is mounted and gripped within the collet 12 and a portion of the workpiece projects as shown from the collet 12 for machining. The collet adapter 10 is mounted in practice within the headstock of a CNC machine (not shown) and is rotatable via a drive arrangement of the headstock for rotating the workpiece W. The workpiece W would also be supported in practice on a workpiece support 13 which has a V groove 14 for accepting the workpiece. A clamp C can be brought down into contact with the workpiece W to restrict movement of the workpiece W within the support 13 other than rotational movement about the workpiece centre-line or axial movement along the workpiece centre-line.

Each of the collet adapter 10 (through the collet 12) and the workpiece support 13, clamp the workpiece W for machining. Thus, where the axes of the collet adapter and the workpiece support are not aligned, the workpiece is subject to misalignment loading during machining. Any misalignment between the workpiece support and the collet adapter can cause inaccuracy in the position of the workpiece on the workpiece support and that can affect the accuracy with which the workpiece is machined. It must be appreciated that in machinery of the kind in which the invention is to be employed, accuracy is required at micron level, so that only minor inaccuracy can have a significant effect on the production of accurate machined workpieces. A problem with prior art machinery arises in arranging acceptable alignment between the respective axes of the collet adapter and the workpiece support, which is too costly and complex.

The present applicant has secured U.S. Pat. No. 6,598,884 that discloses a collet adapter which has fine adjustment provided by a series of adjustment pins that directly engage the collet at circumferentially spaced locations to adjust the angle of the central longitudinal axis of the collet relative to the central longitudinal axis of the collet adaptor. While a collet adapter of this kind can be finely adjusted to reduce misalignment errors, the manual nature of the adjustment means that set-up time is increased while the adjustment is made.

U.S. Pat. No. 4,776,734 discloses a tool holder with two adjustable components which are secured together by set screws and adjustment is made via a ring and grub screw arrangement to fix relative eccentricity between the two components. Again, the disclosure is of a manual adjustment mechanism that is adjusted during machine set-up.

FIGS. 2i and 2ii illustrate different forms of misalignment of a workpiece W that can occur within prior art machinery and which the present invention is intended to correct or accommodate. Both figures show a portion of the collet adapter 10 including a collet 12 and a workpiece 15. The collet 12 is clamped within the collet adapter 10 and the workpiece 15 projects from the collet 12. The misalignment in each figure is greatly exaggerated for the purposes of explanation.

In FIG. 2i, the same workpiece 15 is shown in four different positions about the axis of rotation of the collet adapter 10 to show the position of the workpiece as the collet adapter 10 rotates. From this figure, it can be seen that the axis A of the workpiece 15 is at an angle to the axis B of rotation of the collet adapter 10. Misalignment of this kind occurs as a result of axial errors caused in the manufacture of the collet adapter and the collet and associated components.

In FIG. 2ii, the same workpiece 15 is again shown in four different positions about the axis of rotation of the collet adapter 10 to show the position of the workpiece as the collet adapter 10 rotates, but in FIG. 2ii, the type of misalignment shown is different to that shown in FIG. 2i. In FIG. 2ii, the axis C of the workpiece 15 is parallel to, but slightly offset from the axis B of rotation of the collet adapter 10. Misalignment of this kind occurs as a result of radial errors caused in the manufacture of the collet adapter and the collet and associated components.

Each of the forms of misalignment shown in FIGS. 2*i* and 2*ii* can result in unacceptable machining errors in a machined workpiece. Accordingly, it is an object of the present invention to overcome or at least alleviate one or more of the problems associated with the prior art.

SUMMARY OF THE INVENTION

According to the present invention there is provided a collet adapter including a workpiece clamp mechanism, the collet adapter being rotatable about a first axis, the clamp mechanism of the collet adapter being mounted within the collet adapter for rotation with the collet adapter and for movement laterally relative to the first axis during rotation of the collet adapter.

The present invention advantageously permits the clamp mechanism to move within the collet adapter both radially and axially, or radially or axially, as the collet adapter is driven to rotate by the machine in which it is employed. By allowing the clamp mechanism to move as described, misalignment between the axis of the workpiece support and the axis of the collet adapter can be accommodated by movement of the clamp. Thus, where the first axis about which the collet adapter rotates is not aligned with the axis of the workpiece support (hereinafter the "second axis"), the clamp mechanism can shift laterally within the collet adapter the distance of any misalignment, so that the first axis of the clamp mechanism aligns with the second axis of the workpiece support. This enables the workpiece support to define the primary axis about which the workpiece being machined is rotated, and loads shifting the workpiece away from that axis (such as generated by misalignment between the first and second axes) are prevented by movement of the clamp mechanism within the collet adapter.

The present invention provides a significant advantage relative to prior art arrangements, by providing an arrangement that permits the position of the clamp mechanism relative to the workpiece support to be adjustable in a dynamic manner as the collet adapter is rotated. This is an important distinction from the prior art, because in the prior art, the amount of misalignment between the first axis of the collet adapter and the second axis of the workpiece support can vary as the collet adapter rotates. Thus, the fixed adjustment arrangements of the prior art might not correct misalignment for the entire 360° of rotation of a collet adapter. However, by allowing movement of the clamp mechanism within the collet adapter while each of the clamp mechanism and collet adapter rotate dynamically, the clamp mechanism is dynamically repositioned as required at any point during the 360° of rotation, to maintain the first axis of the clamp mechanism aligned with the second axis of the workpiece support.

The present invention has been developed with a collet arrangement being the type of clamp mechanism envisaged as for use in the invention. A collet arrangement is intended to include a collet holder and associated components. However the present invention does not exclude other forms of clamp mechanism, such as hydraulic and pneumatic clamp mechanisms, which do not use a collet but which can nevertheless be employed in a collet adapter.

In the arrangement of the present invention, because the clamp mechanism moves laterally or floats within the collet adapter, the load applied by the collet adapter to a workpiece which is gripped both in the collet adapter and in a workpiece support, is envisaged to be limited to a rotational or torsional load. Thus, the workpiece is driven to rotate by the collet adapter but is not subjected, or is negligibly subjected to loads tending to bend the workpiece along its centre-line. Because of this, the invention can eliminate or at least alleviate unacceptable machining errors in a machined workpiece by providing greater accuracy of alignment of the first and second axes referred to above during rotation of the collet adapter. As a result, the accuracy of machining is improved.

The clamp mechanism can be dynamically mounted within the collet adapter in any suitable manner. In some arrangements, the clamp mechanism is mounted for movement perpendicular to the axis of rotation of the collet adapter. The movement is linear movement along first and second axes. The first and second axes can extend at an angle to each other of more than 0° and up to 90°. Thus, the axes can be perpendicular, or less than perpendicular. The axes can be in the same plane.

In some arrangements, the clamp mechanism is mounted for rotation about both of the first and second lateral axes.

The first lateral axis can be formed by a pin that extends through the clamp mechanism and the clamp mechanism is mounted on the pin in a manner to be movable along the pin. The clamp mechanism can simply include an opening or bore into which the pin extends with the pin being a loose fit within the opening or bore so that the clamp mechanism can freely move along the pin. Each end of the pin of the first lateral axis can extend into a ring coaxial about the clamp mechanism and can be fixed to the ring. Clearance can be provided between the ring and the clamp mechanism to permit the clamp mechanism to move along the pin towards and away from the ring.

The second lateral axis can be formed by a pair of axially aligned pins that extend respectively from opposite sides of the clamp mechanism and away from the clamp mechanism. The pins can be fixed relative to the clamp mechanism so that the clamp mechanism is movable with the pins along the axis of the pins. Ends of the pins remote from the clamp mechanism can extend into bores of the collet adapter, such as in a housing or body portion of the collet adapter and be movable axially within the bores. The pins can extend through the ring described above before extending into the bores and the clamp mechanism and the ring can be movable together along the axis of the pair of axially aligned pins.

In other forms of the invention, the clamp mechanism can be mounted within a coaxial ring arrangement, in which a first ring is fixed to the collet adapter, a second ring is fixed to the first ring and a third ring is fixed to the second ring. In these forms of the invention, the second and third rings can be rotatable or tiltable and shiftable relative to the first ring and the collet adapter. The manner in which the second and third rings rotate or tilt and shift allows a clamp mechanism mounted within the collet adapter and connected to the third ring, either directly or indirectly, to have both linear and rotational movement to accommodate or correct misalignment with the axis of a workpiece support.

Describing the above form of the invention in more detail, the second ring can be fixed to the first ring by a first pair of axially aligned pins and the third ring can be fixed to the second ring by a second pair of axially aligned pins. The axes of the respective pairs of axially aligned pins can be oriented at an angle to each other of more than 0° and up to 90°. Like the earlier forms of the invention, the axes can thus be oriented perpendicular, or less than perpendicular and they can be in the same plane.

The first ring can have a pair of projections extending from diametrically opposed portions of the ring and the pair of projections can include bores for receipt of or for locating the pins of the first pair of axially aligned pins, so that the second ring can be connected to the first ring by a connection between the pair of projections and the first pair of axially aligned pins.

The third ring can also have a pair of projections extending from diametrically opposed portions of the ring and likewise, the pair of projections can include bores for receipt of or for locating the pins of the second pair of axially aligned pins and the third ring can be connected to the second ring by a connection between the pair of projections and the second pair of axially aligned pins.

By the above arrangement, the first ring can be fixed to a part of the collet holder so that it is stationary relative to the collet holder, while the second ring can rotate or shift or tilt, or one or more of these, through the connection between the pair of projections of the first ring and the first pair of axially aligned pins. Likewise, the third ring can rotate or shift or tilt, or one or more of these, through the connection between the pair of projections of the third ring and the second pair of axially aligned pins. Because the first and second pairs of axially aligned pins are at an angle to each other, the can provide for alignment movement of the clamp through 360° rotation of the collet adapter.

Where the clamp mechanism of a collet adapter according to the invention is a collet, the collet can be indirectly connected to a drawbar via a collet holder and be movable with the drawbar axially of the collet adapter in accordance with normal prior art arrangements. As will be understood by persons skilled in the art, a collet can be connected to a collet holder and an end of the collet holder is connected to the drawbar to move the collet axially relative to the collet holder. As applied to the present invention, each of the drawbar, the collet holder and the collet can be mounted within the collet adapter for rotation with the collet adapter and for movement laterally to the first axis of the collet adapter.

The collet can be mounted within a sleeve and the sleeve can be connected to the third ring, such as via a radial flange of the sleeve. The collet can be movable axially relative to the sleeve with the drawbar to release or clamp a workpiece. Each of the sleeve and the collet can include cooperating tapered surfaces so that with axial movement of the collet relative to the sleeve, the fingers of the collet can be made to radially close or open to shift between clamp and release positions. In this form of the invention, the sleeve has the same alignment movement as the collet through the coaxial ring arrangement.

Other components of the collet adapter which are connected to the collet or the drawbar can also be mounted within the collet adapter for rotation with the collet adapter and for movement laterally to the first axis relative to the collet adapter with the collet.

The present invention extends to a machine that includes a collet adapter as described above. Such a machine can include a workpiece support and the machine can be a grinding or milling machine for example.

BRIEF DESCRIPTION OF THE DRAWINGS

In order that the invention may be more fully understood, some embodiments will now be described with reference to the figures in which:

FIGS. 3 to 5 are side, perspective and end views of the front end portion of a collet adapter according to the present invention.

FIG. 6 is a 90° cross-section of the front end portion of the collet adapter of FIGS. 3 to 5.

DETAILED DESCRIPTION OF THE DRAWINGS

Figure 1:
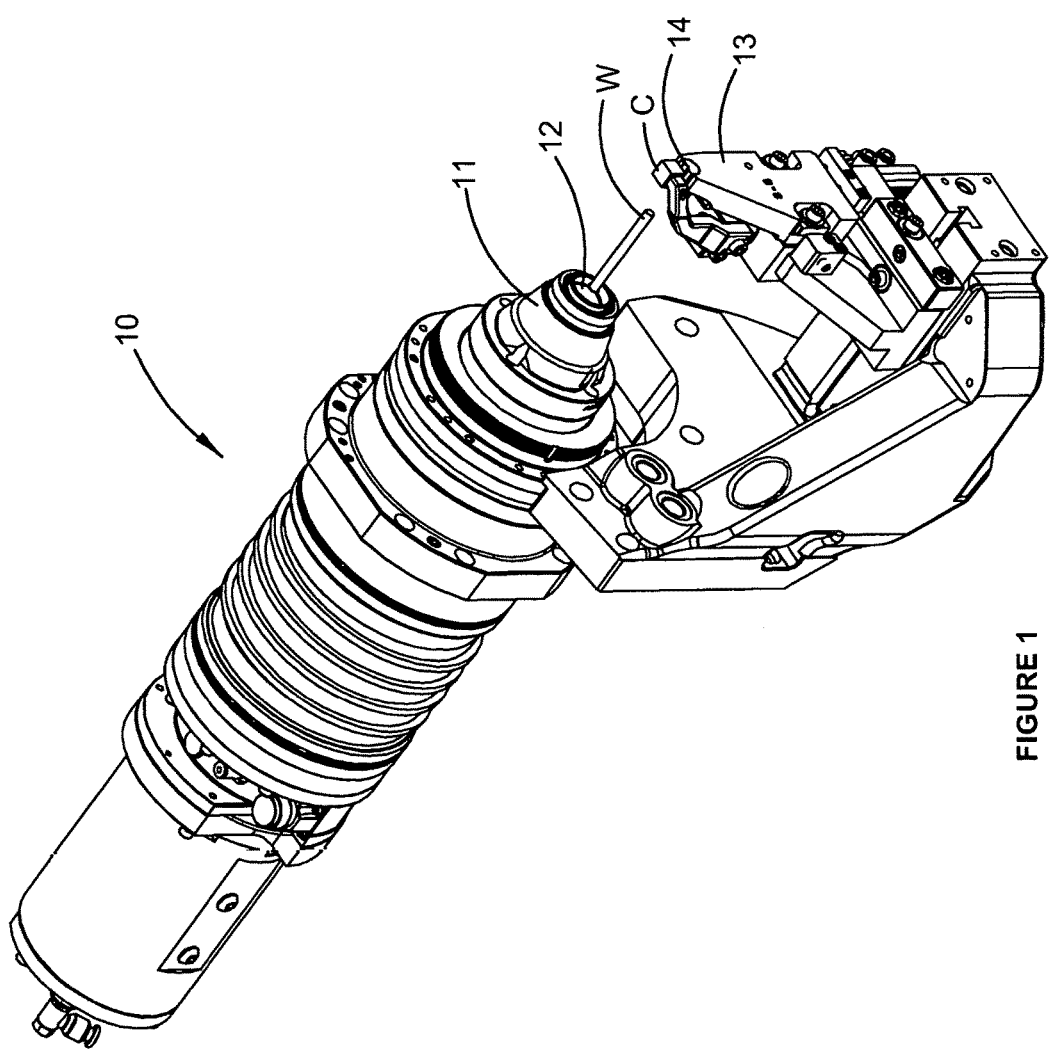
FIG. 1 is a perspective view of a front end portion of a collet adapter and a workpiece support for supporting a workpiece clamped by the collet adapter.
Figure 2I:
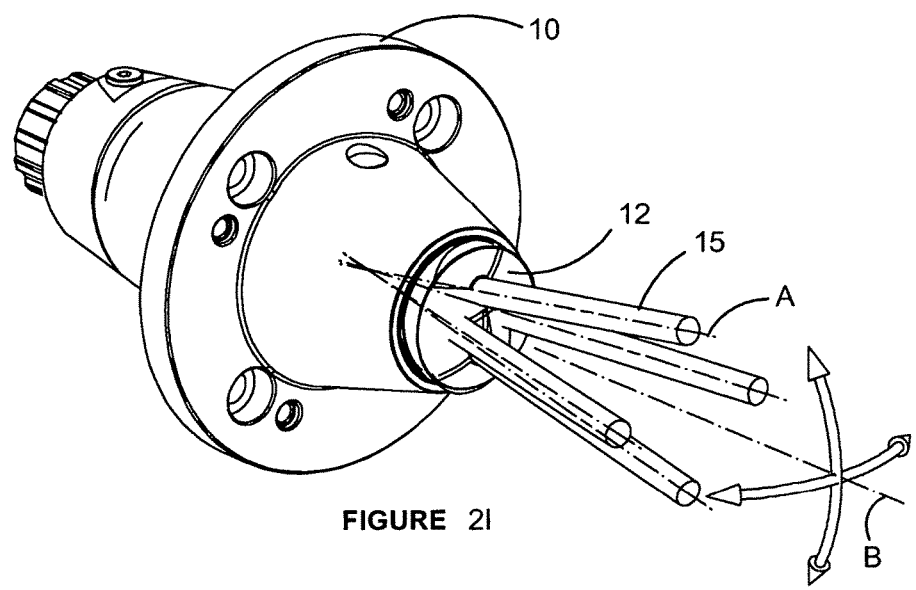
FIGS. 2I and 2II show exaggerated misalignment movement in a workpiece mounted in a collet adapter.
Figure 2I:
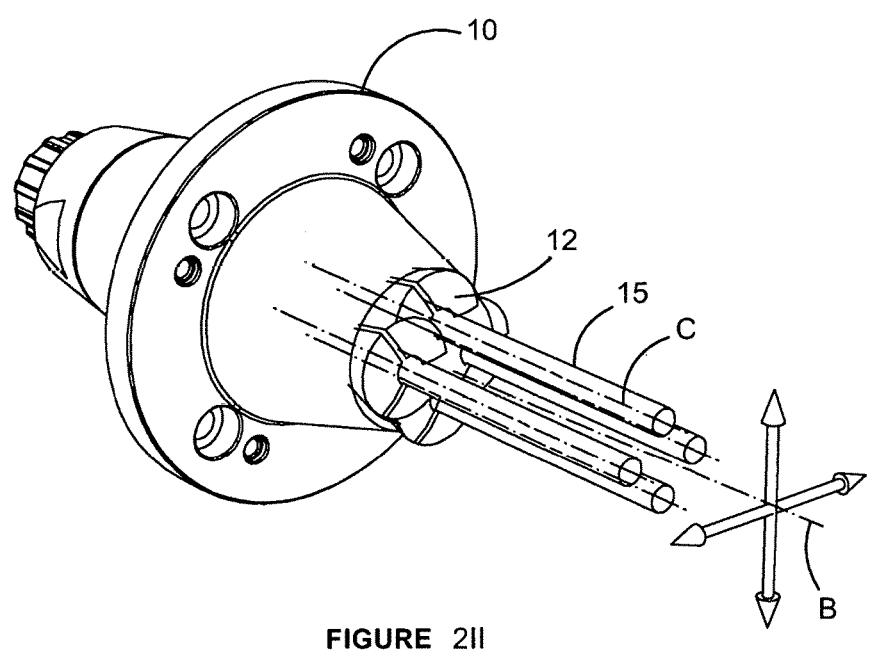

FIG. 3 is an illustration of the collet adapter portion 10 illustrated in FIG. 1 but modified in accordance with the present invention. Thus, FIG. 3 illustrates a front end 20 of a collet body that includes a base 21 and a cap 22. The cap 22 is connected to the base 21 by four screws 23 (see FIGS. 4 and 5) and the base 21 can be connected to a machine spindle (not shown) via screws 24.

A collet holder 25 is disposed within the body 20 and projects through each side of the body 20. The collet holder 25 is illustrated in cross-sectional view in FIG. 6 and with reference to that figure, the collet holder 25 comprises a push out tube 26, an outer sleeve 27 and an inner sleeve 28. The collet holder 25 receives a clamping collet 29 and a nut 30. The collect holder 25 is of a relatively standard form in terms of the components identified above and operates by the collet 29 radially expanding and contracting about a workpiece which is loaded into the collet 29. The collet 29 includes a plurality of lengthwise slits 31 and the portions between the slits 31 include tapered leading ends which mate with a tapered inside surface of the nut 30. The collet 29 can be expanded by moving the tube 26, the outer sleeve 27 and the nut 30 forward relative to the inner sleeve 28 so that the tapered surfaces of the nut 30 shift relative to the tapered surface of the inner sleeve 28. By that movement, the sections of the collet 29 between the slits 31 to splay radially outwardly so that a workpiece clamped in the clamping collet 29 can be released.

Conversely, to clamp a workpiece in the collet holder 25, the workpiece is positioned within the collet 29 and with the nut 30 screwed onto the leading end of the outer sleeve 27, the tube 26, the outer sleeve 27 and the nut 30 are moved rearward relative to the inner sleeve 28, causing the respective tapered surfaces of the collet 29 and the inner sleeve 28 to cause the portions of the collet 29 between the slits 31 to shift inwardly to a clamping position.

The nut 30 is applied only at the initial set-up stage of the collet adapter and once applied, is not removed except to change to a different size collet.

Figure 7:
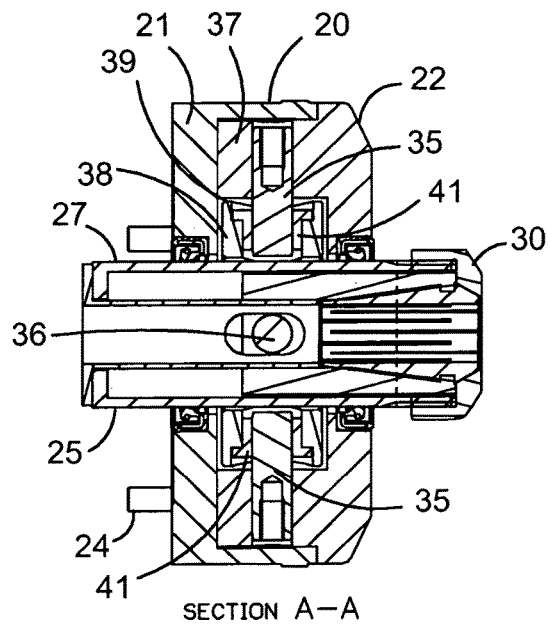
FIGS. 7 and 8 are cross-sectional views through A-A and B-B respectively of FIG. 5.
Figure 8:
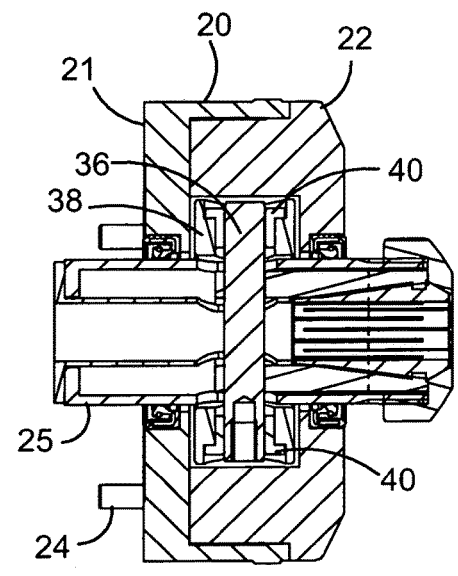

The arrangement illustrated in FIGS. 3 to 6 allows the collet holder 25 to move laterally relative to the axis A (see FIG. 3), to accommodate or correct any misalignment between the axis of rotation of a collet adapter and the axis of a workpiece support. That movement is facilitated by the arrangement shown in FIG. 6, which includes pins 35 and 36. While only one pin 35 is illustrated in FIG. 6, a second pin is disposed opposite the pin 35 and extending along the same axis, and is illustrated in FIG. 7, which is a cross-section through A-A of FIG. 5. FIG. 8 is a cross-section through B-B of FIG. 5 and shows the full length of the pin 36. By this arrangement of pins 35 and 36, the collet holder 25 is movable laterally of the axis A along the respective axes of the pins 35 and 36 as hereinafter described.

The collet holder 25 is hollow as shown in FIG. 6. The pin 36 extends through the collet holder 25 and through a collet ring 38. The collet ring 38 is located within an annular recess 39 formed between the base 21 and the cap 22. The inner sleeve 28 is fixed to the pin 36 and the pin 36 is movable within the bushes 40 within the bores formed in the ring 38. Thus, by the inner sleeve 28 being fixed to the pin 36 the collet holder 25 can shift with the pin 36 along the axis of the pin 36.

The pair of further pins 35 extends perpendicular to the pin 36 and extends though openings in the ring 38 and into the bores 37 of the cap 22. As seen in FIG. 7, the pins 35 do not extend through the collet holder 25, but rather, extend away from the collet holder 25 from a position adjacent the surface of the outer sleeve 27. The pins 35 are fixed within the bores 37, while the ring 38, the bushes 41 and the collet holder 25 can all move relative to the pins 35 along the axis of the pins 35.

Thus, in the orientation shown in FIG. 6, the collet holder 25 can shift sideways along the axis of the pin 36 moving with the pin 36, as well as up and down along the axis of the pins 35 relative to the pins 35. The sideways movement is movement of the collet holder 25 and the pin 36 relative to the ring 38, while the up and down movement is combined movement of the collet holder 25, the pin 36 and the ring 38.

In addition to the lateral movement of the collet holder 25 along the axis of the pins 35 and 36, the collet holder 25 can rotate about the pin 36 as shown by the arrow $R_1$ in FIGS. 3 and 4 and about the pins 35 as shown by the arrow $R_2$ in FIG. 4. It will be appreciated that by this rotational movement, and with the movement along the axes of the pins 35 and 36, the collet is capable of movement radially about the drive axis through 360°.

It follows that the collet adapter of the invention can accommodate misalignment between the axes of rotation of the collet adapter and a workpiece support by the horizontal and sideways movement of the collet holder 25 as well as by the rotational movement about the pins 35 and 36. In effect, by suitable mounting of the collet body 20 in a collet adapter, the collet holder 25 can float relative to the collet adapter as required to maintain the workpiece aligned with the axis of the workpiece support and the collet adapter imposes negligible load on the workpiece other than rotational load and a load to restrain axial movement.

It is to be noted that FIG. 6 includes a slot 42 through which the pin 36 extends. That slot 42 is provided to permit axial movement of the tube 26, the outer sleeve 27 and the nut 30 to facilitate clamping or unclamping of a workpiece from the collet 29. A spring (not shown) is housed within the annular recess 43 and bears against the rear end 44 of the inner sleeve 28 to urge the tube 26, the outer sleeve 27 and the nut 30 in a direction rearwardly relative to the collet 29 for clamping. The collet is unclamped by pushing the tube 26, the outer sleeve 27 and the nut 30 forward by a pushbar (not shown in the drawings). The slot 42 is formed in each of the tube 26 and the outer sleeve 27, but is not formed in the inner sleeve 28.

Figure 9:
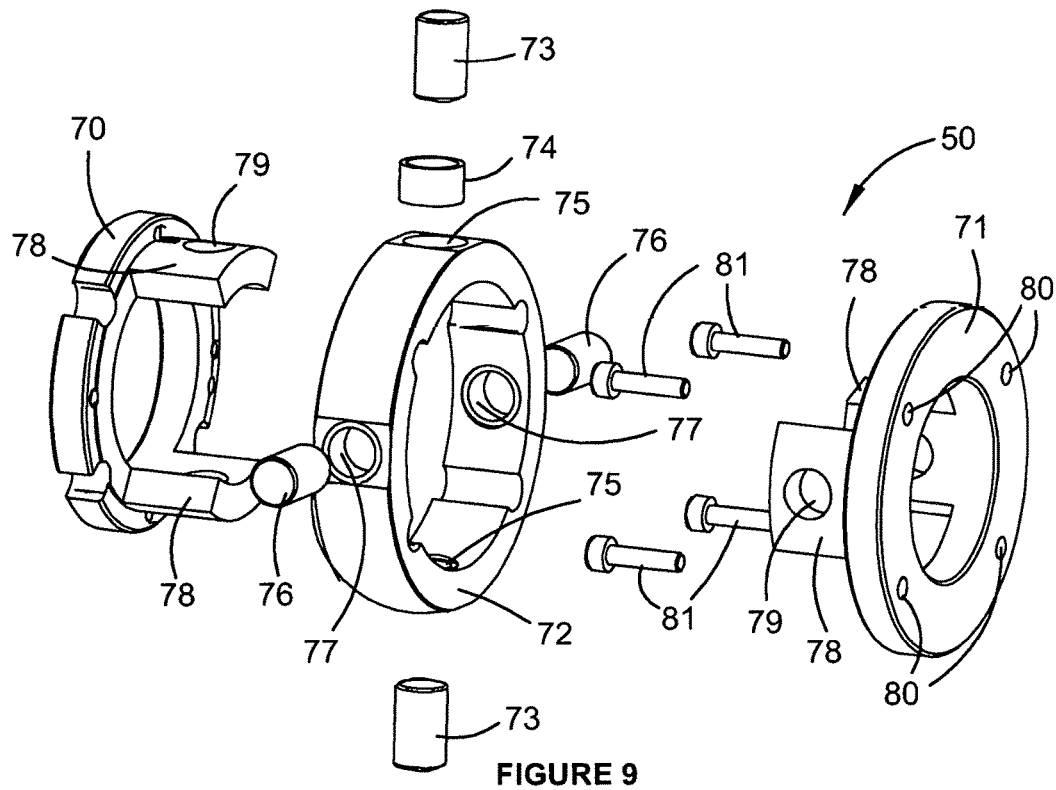
FIG. 9 is an exploded view of a component of a collet adapter according to an alternative embodiment of the present invention.
Figure 10:
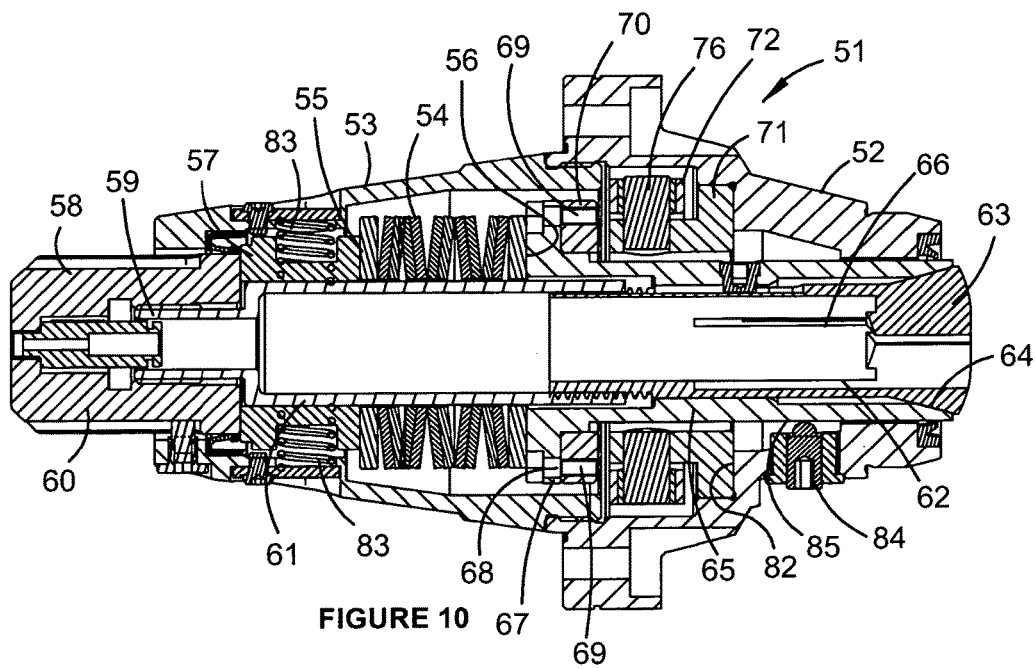
FIG. 10 is a cross-sectional view of a collet adapter according to the present invention which employs the component of FIG. 9.
Figure 11:
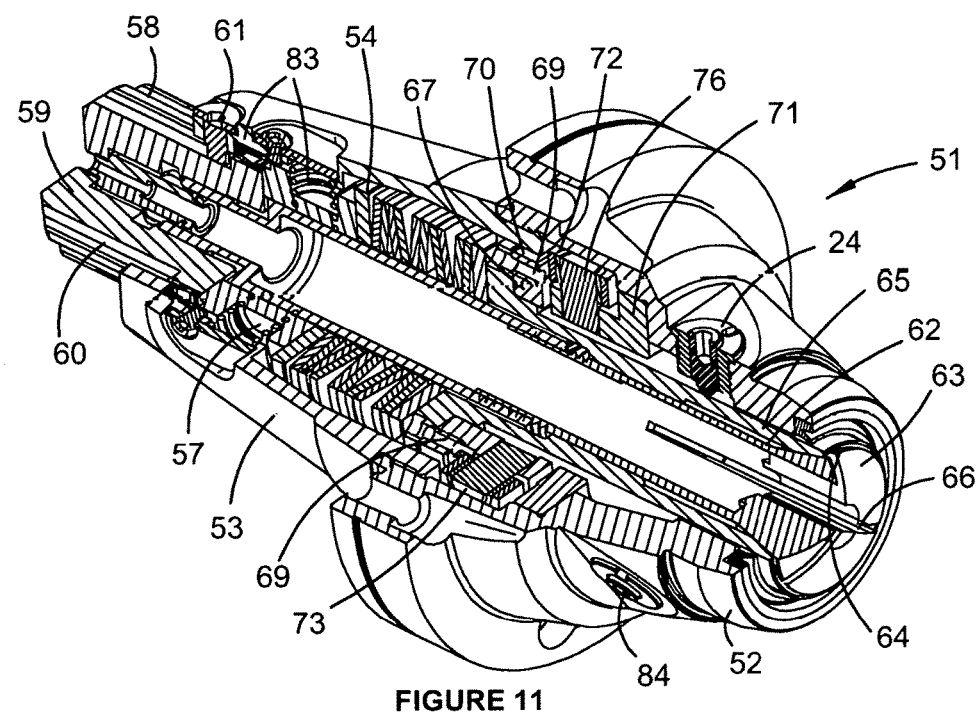
FIG. 11 is a 90° cross-section of the collet adapter of FIG. 10.

FIG. 9 illustrates a component of a collet adapter which has an alternative form to the arrangement shown in FIGS. 3 to 8. The arrangement 50 illustrated in FIG. 9 is for inclusion in a collet adapter 51 of the kind shown in FIGS. 10 and 11, which is a different form to that of the earlier figures. With reference to FIGS. 10 and 11, the collet adapter 51, includes a front body portion 52, a rear body portion 53, which are engaged by threads, and a plurality of disc springs 54 which are located in compression between opposing shoulders 55 and 56. The springs 54 tend to shift the ring 57, which includes the shoulder 55, away from the front body portion 52 and that tends to push the drawbar 58 in the same rearward direction. The drawbar 58 includes the end portion 60 and the internal portion 61 which are connected by threads. Rearward movement of the drawbar 58 results in rearward movement of the internal portion 61 which is connected to the collet 62 by threads.

In accordance with normal construction, the collet 62 has a tapered head 63, which bears against a matching tapered surface 64 of the annular sleeve 65 and axial movement of the collet 62 shifts the head 63 relative to the surface 64 to enable the collet 62 to grip or release a workpiece. Movement of the head 63 relative to the surface 64 either opens or closes the slits 66 of the collet 62 and by opening the slits, the sections of the tapered head 63 can splay outwardly and thus allow release or insertion of a workpiece for gripping.

The disc springs 54 naturally return the collet 62 to the position shown in FIG. 10, which is a gripping position, while movement of the drawbar 58 against the bias of the springs 54 shifts the collet 62 axially forward and allows the head 63 to open and a workpiece to be released or inserted.

It will be appreciated that FIG. 10 includes a number of other components not described above, but most of these are irrelevant to the present invention and therefore will not be described further. A person skilled in the art would readily appreciate the majority of the construction of the collet adapter 51 as illustrated.

Figure 12:
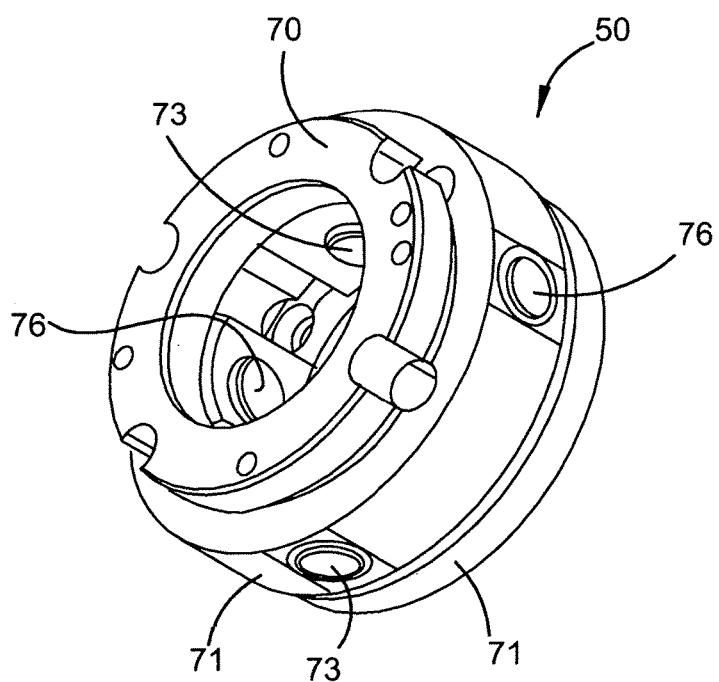
FIG. 12 is an assembled perspective view of the component of FIG. 9.

Disposed within the front body portion 52 of the collet adapter 51 is the arrangement 50 of FIG. 9. Returning to FIG. 9, the arrangement 50 includes front and rear rings 70 and 71 and intermediate ring 72. FIG. 12 illustrates the arrangement 50 in an assembled form.

In FIG. 9, the ring 70 is to be connected to the ring 72, via pins 73 which are received in bushes 74 (only one of which is shown in FIG. 9), in bores 75 through the ring 72.

Likewise, the ring 71 is connected to the ring 72, via pins 76 which are received in bushes 77, in bores (not numbered) in the ring 72. Each of the rings 70 and 71 include projections 78 and each of the projections 78 includes a bore 79 for the passage of a respective pin 73 or 76.

The arrangement 50 allows relative movement between the respective rings 70, 71 and 72 about the respective pins 73 and 76. The movement can be considered as translational and rotating movement. The ring 72 can rotate or tilt about and move, shift or translate along the axes of pins 76, while the ring 70 moves with the ring 72 during any tilting or translation relative to the pins 72, and in addition, the ring 70 can rotate or tilt about and move, shift or translate along the axes of the pins 73, which is perpendicular to the axes of pins 76. The ring 70 can move independently relative to the ring 72.

The ring 71 includes bores 80 through which screws (not shown) can pass to fix the ring 71 to the facing surface 82 (see FIG. 10) of the front body portion 52. By fixing the ring 71 to the face 82, the ring 71 is precluded from movement relative to the body portion 52 and the rear body portion 53. However, the rings 72 and 70 are free to move relative to the ring 71 and to each other in the manner described above.

The collet 62 is connected to the arrangement 50 by the annular sleeve 65 which has a radial flange 67. The flange 67 includes a plurality of bores 68 for receiving screws (not shown) and the bores 68 align with bores 69 in the ring 70, so that screws can extend through the respective bores 68 and 69 to fix the flange 67 to the ring 70. As will be explained later herein, rearwardly of the flange 67, many of the components of the collet adapter 51 are mounted with sufficient clearance within the body portions 52 and 53 to move within those portions with the collet 62 and the sleeve 65.

As will be apparent from the above discussion, the ring 72 can tilt relative to the ring 71 about the axes of the pins 76. Moreover, the ring 70 can tilt relative to both the ring 71 and the ring 72 about the axes of the pins 73. In addition, the ring 72 is shiftable along the axis of the pins 76, while the ring 70 is shiftable along the axis of the pins 73. Thus, relative to the ring 71, each of the rings 70 and 72 can tilt and both is shiftable along the respective axes defined by the pins 76 and 73. The amount of movement available between the rings 70 to 72 is limited by engagement between the rings. Thus, in the examples illustrated, tilting of the ring 70 relative to the ring 72 is limited to about 3° before the respective rings come into contact and prevent further tilting. The amount of tilting can be controlled by the gaps between the adjacent faces of the rings 70 and 72. The amount of shifting movement between the rings 70 to 72 is in the region of above 0 mm and less than 3 mm. Clearly more tilting or shifting movement can be provided by different dimensions of the rings and the clearance between them.

In addition, while the arrangement of FIG. 9 is of a different construction to the arrangement illustrated in FIGS. 3 to 8, the movement made available by the respective arrangements is substantially the same.

Returning to FIGS. 10 and 11, employment of the arrangement 50 in the collet adapter 51 allows the collet 62 to move with each of the rings 70 and 72. This is because the collet 62 is mounted within the annular sleeve 65 which itself is mounted to the arrangement 50 by the radial flange 67. The annular sleeve 65 is connected as described earlier, through the springs 54 to the ring 57 and to the drawbar 58. As shown in FIG. 10, all of those components are effectively able to shift within the body portions 52 and 53 by clearance with those portions. Springs 83 provide a centralising load to the ring 57, but otherwise, the components described above are free to float, move or shift within the collet adapter 51 in accordance with the positions of the rings 70 and 72. This means that the axis of the collet 62 can shift and tilt as required for compliance with the axis of the workpiece clamped within a workpiece support of the kind illustrated in FIG. 1. The axis of the workpiece as clamped in the workpiece support becomes the dominant axis and the invention provides the manner in which the workpiece can be clamped in the collet adapter but with the ability to move to align with the axis of the workpiece support. Movement of the collet 62 thus prevents a workpiece from being loaded in a manner which would tend to shift the workpiece on the workpiece support (by bending for example) and thus affect the accuracy with which the workpiece is machined.

Because a collet is movable within the collet adapter as discussed above, the collet adapter 51 includes screws 84 which can be used to bear against the outer surface 85 of the collet 62 to position the collet 62 during set-up of the collet adapter in a relevant machine for initial alignment of the workpiece being machined and the workpiece support. Three screws 84 are provided spaced equidistantly about the front body portion 52. The exercise of alignment is intended to align the axis of the collet, and thus the axis of the workpiece clamped or gripped by the collet, with the workpiece support as accurately as possible, so that the need for correction by the arrangements of the invention are minimised. Without the screws 84, the collet will tend to angle downwardly under its own weight and this makes alignment difficult.

The arrangements illustrated in FIGS. 3 to 8 and 9 to 12, illustrate that different arrangements can still produce the collet movement that is required to accommodate or correct any misalignment between the axis of rotation of a collet adapter and the axis of a workpiece support. Clearly there are other arrangements which would provide for similar movement and these are within the scope of the present invention.

The invention described herein is susceptible to variations, modifications and/or additions other than those specifically described and it is to be understood that the invention includes all such variations, modifications and/or additions which fall within the spirit and scope of the present disclosure.

The claims defining the invention are as follows:

1. A collet adapter including a collet for clamping a workpiece, the collet adapter being rotatable about a first axis, the collet being mounted within the collet adapter within a coaxial ring arrangement for rotation with the collet adapter and for lateral movement relative to the first axis during rotation of the collet adapter and for rotational movement lateral to the first axis during rotation of the collet adapter, the lateral movement comprising linear movement along each of a first lateral axis which is perpendicular to the first axis of rotation of the collet adapter and a second lateral axis which is perpendicular to the first axis of rotation of the collet adapter and which is at an angle of more than 0° and up to 90° to the first lateral axis, and the lateral rotational movement being rotation about each of the first and second lateral axes, each of the first and second lateral axes being formed by pins, the coaxial ring arrangement comprising a first ring which is fixed to the collet adapter, a second ring which is fixed to the first ring and a third ring which is fixed to the second ring, the collet being fixed to the third ring, the second and third rings being rotatable and shiftable relative to the first ring and the collet adapter to provide the lateral movement and the lateral rotational movement about the first and second lateral axes.

2. A collet adapter according to claim 1, the first and second lateral axes being at 90° to each other.

3. A collet adapter according to claim 1, the first and second lateral axes being in the same plane.

4. A collet adapter according to claim 1, the first lateral axis being formed by a pin that extends through the collet and the collet being movable along the pin.

5. A collet adapter according to claim 4, each end of the pin of the first lateral axis extending into a ring coaxial about the collet and being fixed to the ring, clearance between the ring and the collet permitting the collet to move along the pin relative to the ring.

6. A collet adapter according to claim 1, the second lateral axis being formed by a pair of axially aligned pins that extend respectively from opposite sides of the collet and away from the collet and that are fixed relative to the collet so that the collet is movable with the pins along the axis of the pins.

7. A collet adapter according to claim 6, the pair of axially aligned pins extending into bores of the collet adapter and being movable axially within the bores.

8. A collet adapter according to claim 7, the pair of axially aligned pins extending through the ring before extending into the bores and the collet and the ring being movable together along the axis of the pair of axially aligned pins.

9. A collet adapter according to claim 1, the second ring being fixed to the first ring by a first pair of axially aligned pins and the third ring being fixed to the second ring by a second pair of axially aligned pins, the axes of the respective pairs of axially aligned pins being at an angle to each other of more than 0° and up to 90°.

10. A collet adapter according to claim 9, the axes of the respective pairs of axially aligned pins being at an angle of 90° to each other.

11. A collet adapter according to claim 9, the first ring having a pair of projections extending from diametrically opposed portions of the ring and the pair of projections including bores to locate the pins of the first pair of axially aligned pins and the second ring being connected to the first ring by the pair of projections.

12. A collet adapter according to claim 9, the third ring having a pair of projections extending from diametrically opposed portions of the ring and the pair of projections including bores to locate the pins of the second pair of axially aligned pins and the third ring being connected to the second ring by the pair of projections.

13. A collet adapter according to claim 1, the collet being connected to a drawbar and being movable with the drawbar axially of the collet adapter, each of the drawbar and the collet being mounted within the collet adapter for rotation with the collet adapter and for movement laterally to the first axis relative to the collet adapter.

14. A machine including a collet adapter according to claim 1.

15. A machine according to claim 14, including a workpiece support.

16. A machine according to claim 14, the machine being a grinding or milling machine.

\* \* \* \* \*